US012603534B2

(12) United States Patent
Neet et al.

(10) Patent No.: US 12,603,534 B2
(45) Date of Patent: Apr. 14, 2026

(54) ELECTRIC MACHINE INCLUDING FIELD COIL SEPARATORS HAVING AN INTEGRATED COOLANT FLOW PATH

(71) Applicant: BorgWarner Inc., Auburn Hills, MI (US)

(72) Inventors: Kirk Neet, Noblesville, IN (US); Joshua B. Lahrman, New Palestine, IN (US)

(73) Assignee: BORGWARNER INC., Auburn Hills, MI (US)

( * ) Notice: Subject to any disclaimer, the term of this patent is extended or adjusted under 35 U.S.C. 154(b) by 196 days.

(21) Appl. No.: 18/536,528

(22) Filed: Dec. 12, 2023

(65) Prior Publication Data

US 2025/0192632 A1 Jun. 12, 2025

(51) Int. Cl.
H02K 3/24 (2006.01)
H02K 1/26 (2006.01)

(52) U.S. Cl.
CPC ................. H02K 3/24 (2013.01); H02K 1/26 (2013.01)

(58) Field of Classification Search
CPC .......... H02K 1/24; H02K 23/405; H02K 9/00; H02K 9/19; H02K 3/487; H02K 3/34; H02K 15/12
See application file for complete search history.

(56) References Cited

U.S. PATENT DOCUMENTS

| | | | |
|---|---|---|---|
| 3,596,120 A | 7/1971 | Potter | |
| 5,886,446 A * | 3/1999 | Katagiri | ................... H02K 1/24 |
| | | | 29/598 |
| 6,791,230 B2 * | 9/2004 | Tornquist | ............... H02K 3/527 |
| | | | 310/214 |
| 2018/0109170 A1 * | 4/2018 | Park | ........................ H02P 29/00 |
| 2023/0179037 A1 | 6/2023 | Bradfield | |
| 2023/0179051 A1 * | 6/2023 | Siepker | .................... H02K 1/24 |

FOREIGN PATENT DOCUMENTS

| | | |
|---|---|---|
| GB | 974730 A | 11/1964 |
| GB | 1217855 A | 12/1970 |
| GB | 1381109 A | 1/1975 |

* cited by examiner

*Primary Examiner* — Leda T Pham
(74) *Attorney, Agent, or Firm* — CANTOR COLBURN LLP

(57) ABSTRACT

A rotor for an electric machine includes a shaft. A plurality of rotor laminations is mounted to the shaft. The plurality of rotor laminations includes a plurality of rotor teeth. A plurality of field coils is disposed about corresponding ones of the plurality of rotor teeth. A plurality of field coil separators extend axially along the rotor between adjacent ones of the plurality of field coils. Each of the plurality of field coil separators includes a coolant circulation system. The coolant circulation system includes a plurality of external coolant flow paths. Each of the plurality of field coil separators includes a resilient frame and an outer shell over molded onto the resilient frame, the outer shell including an outer surface.

22 Claims, 7 Drawing Sheets

ELECTRIC MACHINE INCLUDING FIELD COIL SEPARATORS HAVING AN INTEGRATED COOLANT FLOW PATH

BACKGROUND

Exemplary embodiments pertain to the art of electric motors and, more particularly, to a cooling system for an electric machine having a wound field rotor.

During operation, electric motors produce heat. Often times, rotating components of an electric motor may support a fan member that directs a flow of air through internal motor components. The flow of air may help with smaller systems, such as alternators, and systems that are installed in in open areas, such as generators. The flow of air is not always sufficient in high output systems, particularly those installed in closed areas, such as motor vehicle engine compartments.

Electric motors that are employed as prime movers in, for example, a vehicle, typically include a liquid coolant system. The electric motor includes a stator and a rotor. The liquid cooling system may include an inlet that receives coolant and an outlet that guides coolant to a heat exchange system. The coolant may flow in a jacket arranged radially outwardly of a stator of the electric motor. Additional coolant may be directed onto the rotor, or between the rotor and a shaft supporting the rotor.

Cooling external surfaces of the rotor laminations and an interface between the rotor laminations and the shaft is beneficial. However, remaining portions of the rotor also produce heat that can detract from an overall operational efficiency. Accordingly, the industry would be receptive to a cooling system that interacts with internal rotor surfaces as well as rotor winding surfaces to increase operating efficacy.

SUMMARY

A rotor for an electric machine, in accordance with a non-limiting example, includes a shaft including an outer surface section, an inner surface section defining a flow path, and an opening defining a passage extending from the flow path through the outer surface section. The shaft defines an axis of rotation of the rotor. A plurality of rotor laminations is mounted to the outer surface section. The plurality of rotor laminations includes an inner surface portion disposed on the shaft, an outer surface portion, and a plurality of rotor teeth. The plurality of rotor laminations include a plurality of coolant passages extending between the inner surface portion and the outer surface portion. A plurality of field coils is disposed about corresponding ones of the plurality of rotor teeth. The plurality of coolant passages extend axially along the plurality of rotor laminations between adjacent ones of the plurality of field coils. A plurality of field coil separators extend axially along the rotor between adjacent ones of the plurality of field coils. Each of the plurality of field coil separators includes a coolant circulation system. The coolant circulation system includes a plurality of external coolant flow paths. Each of the plurality of field coil separators includes a resilient frame and an outer shell over molded onto the resilient frame, the outer shell including an outer surface.

An electric machine, in accordance with a non-limiting example, includes a housing including an interior. A stator arranged in the interior and fixedly connected to the housing. The stator includes a stator core and a plurality of stator windings supported by the stator core. The plurality of stator windings have a first end turn and a second end turn. The first end turn is axially spaced from the second end turn by the stator core. A rotor is arranged in the interior and rotatably supported within the stator. The rotor includes a shaft including an outer surface section, an inner surface section defining a flow path, and an opening defining a passage extending from the flow path through the outer surface section. The shaft defines an axis of rotation of the rotor. A plurality of rotor laminations is mounted to the outer surface section. The plurality of rotor laminations includes an inner surface portion disposed on the shaft, an outer surface portion, and a plurality of rotor teeth. The plurality of rotor laminations include a plurality of coolant passages extending between the inner surface portion and the outer surface portion. A plurality of field coils is disposed about corresponding ones of the plurality of rotor teeth. The plurality of coolant passages extend axially along the plurality of rotor laminations between adjacent ones of the plurality of field coils. A plurality of field coil separators extend axially along the rotor between adjacent ones of the plurality of field coils. Each of the plurality of field coil separators includes a coolant circulation system. The coolant circulation system includes a plurality of external coolant flow paths. Each of the plurality of field coil separators includes a resilient frame and an outer shell over molded onto the resilient frame, the outer shell including an outer surface.

A field coil separator, in accordance with a non-limiting example, includes a resilient frame configured to be loaded into the plurality of coolant passages between adjacent ones of plurality of field coils by first compressing the resilient frame and then releasing the resilient frame.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
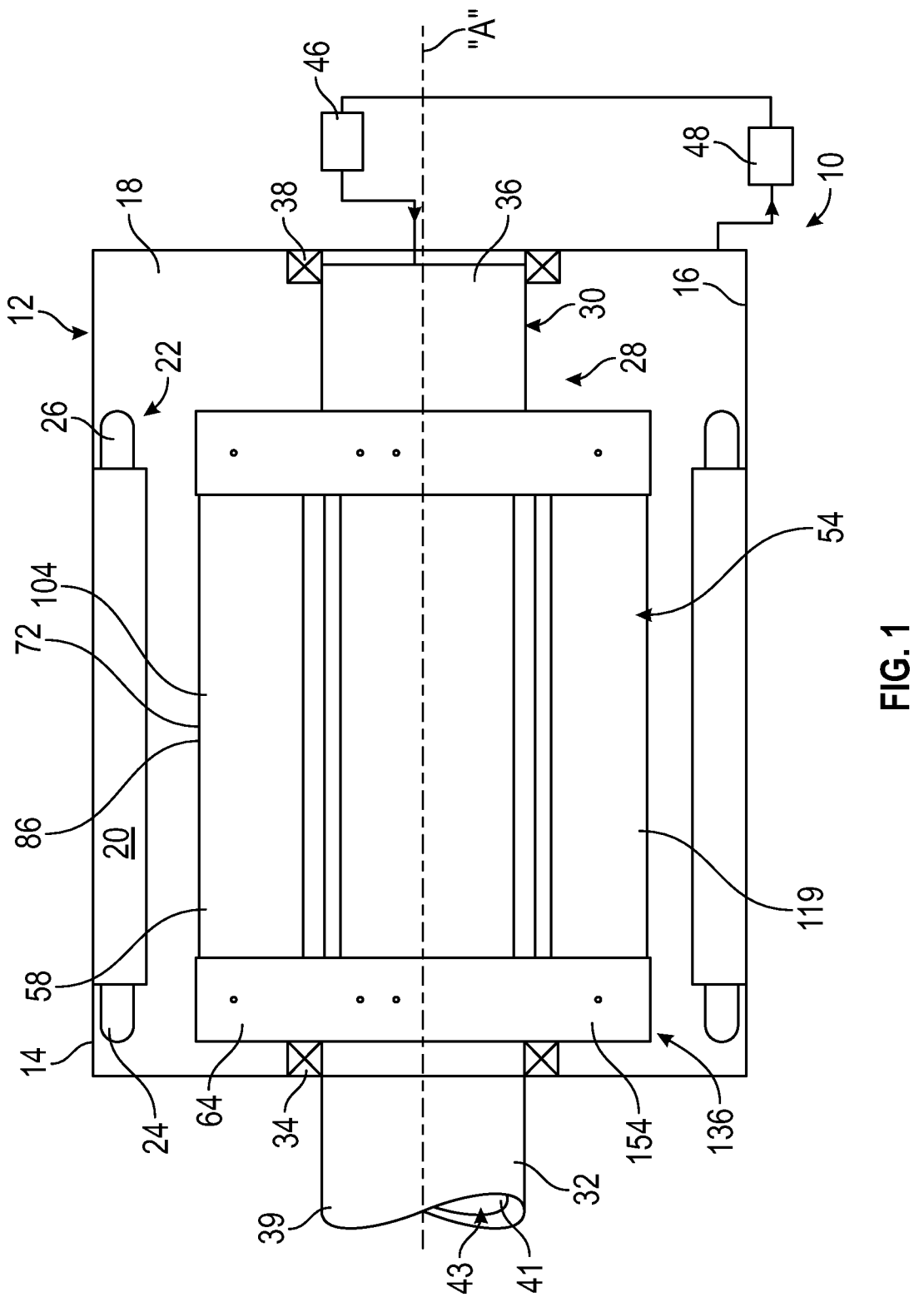
FIG. 1 is a cross-sectional side view of an electric machine including a rotor having a field coil separator provided with an integrated coolant flow path, in accordance with a non-limiting example.

An electric machine, in accordance with a non-limiting example, is indicated generally at 10 in FIG. 1. Electric machine 10 includes a housing 12 having an outer surface 14 and an inner surface 16 that defines an interior 18 of housing 12. A stator 20 is fixedly connected to inner surface 16. Stator 20 includes a stator core 21 supporting a plurality of stator windings 22 having a first end turn 24 and a second end turn 26. A wound field rotor 28 is rotatably mounted in housing 12 radially inwardly of stator 20. Would field rotor 28 is supported on a shaft 30 in housing 12.

In a non-limiting example, shaft 30 includes a first end 32 supported by a first bearing 34 and a second end 36 supported by a second bearing 38. An axis of rotation "A" is defined between first end 32 and second end 36. Shaft 30 includes an outer surface section 39 and an inner surface section 41 that defines a coolant flow path 43. Coolant, such as oil, is passed from a coolant supply system 46 through coolant flow path 43. As will be detailed more fully herein, the oil flows through wound field rotor 28, is sprayed onto first end turn 24 and second end turn 26, and is allowed to collect in interior 18 of housing 12 before passing to a coolant drain system and recirculation system 48.

Figure 2:
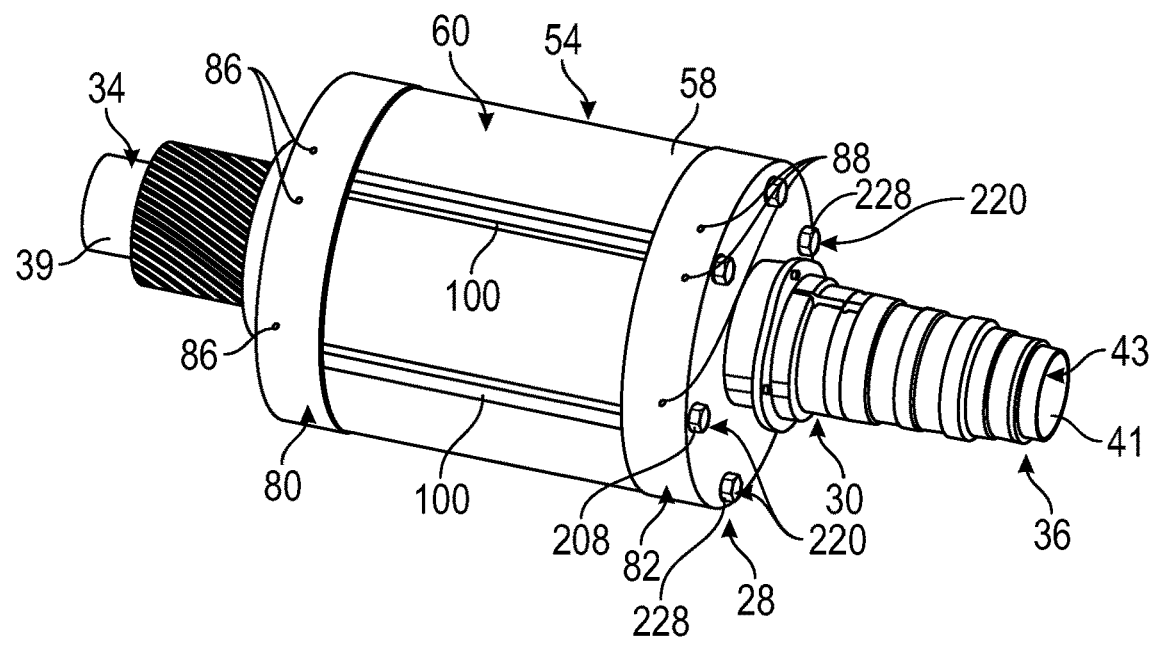
FIG. 2 is a perspective view of the rotor of FIG. 1 including a first balance ring and a second balance ring, in accordance with a non-limiting example.
Figure 3:
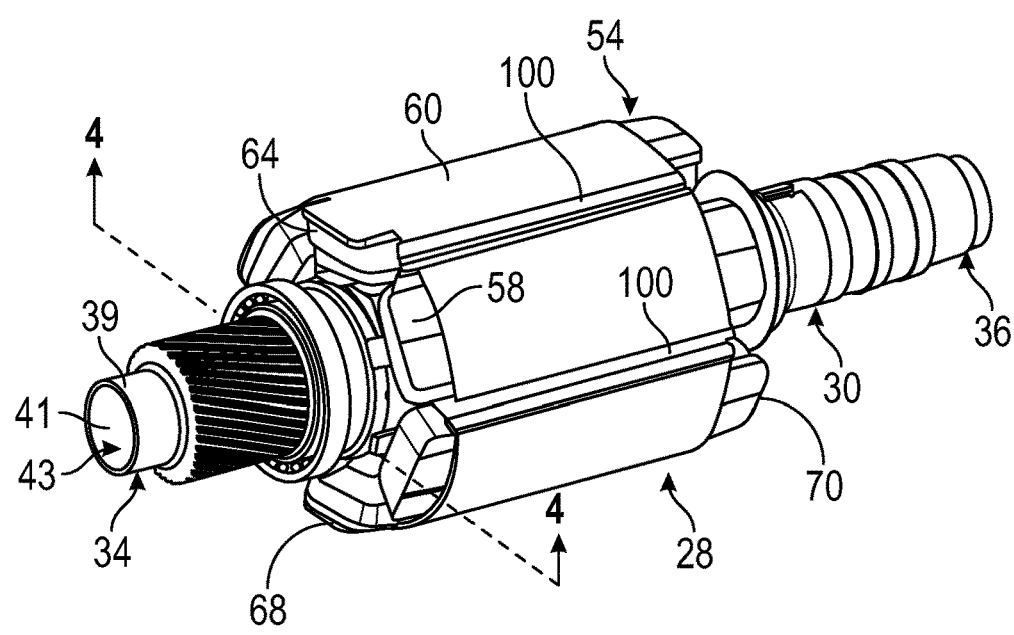
FIG. 3 is a perspective view of the rotor of FIG. 2, without the first balance ring and the second balance ring, in accordance with a non-limiting example.

In a non-limiting example shown in FIGS. 2 and 3, wound field rotor 28 includes a plurality of rotor laminations 54 having an inner surface portion 56 (FIG. 4) and an outer surface portion 58. Plurality of laminations define a plurality of rotor teeth 60. In a non-limiting example, a plurality of field coils 64 extend about each of the plurality of rotor teeth 60. In a non-limiting example, wound field rotor 28 includes a first axial end 68 and a second axial end 70. First axial end 68 supports a first balance ring 80 that covers a first portion of the plurality of field coils 64 and second axial end 70 supports a second balance ring 82 that covers a second portion of the plurality of field coils 64.

First balance ring 80 includes a first plurality of outlet openings 86 and second balance ring 82 includes a second plurality of outlet openings 88. As will be detailed more fully herein, coolant, flowing through shaft 30 passes over the plurality of field coils 64 and exits from first balance ring 80 and second balance ring 82. The coolant passes from the first plurality of outlet openings 86 and is sprayed onto first end turn 24 and from the second plurality of outlet openings 88 and is sprayed onto second end turn 26 to promote cooling of stator 20.

Figures 4, 5:
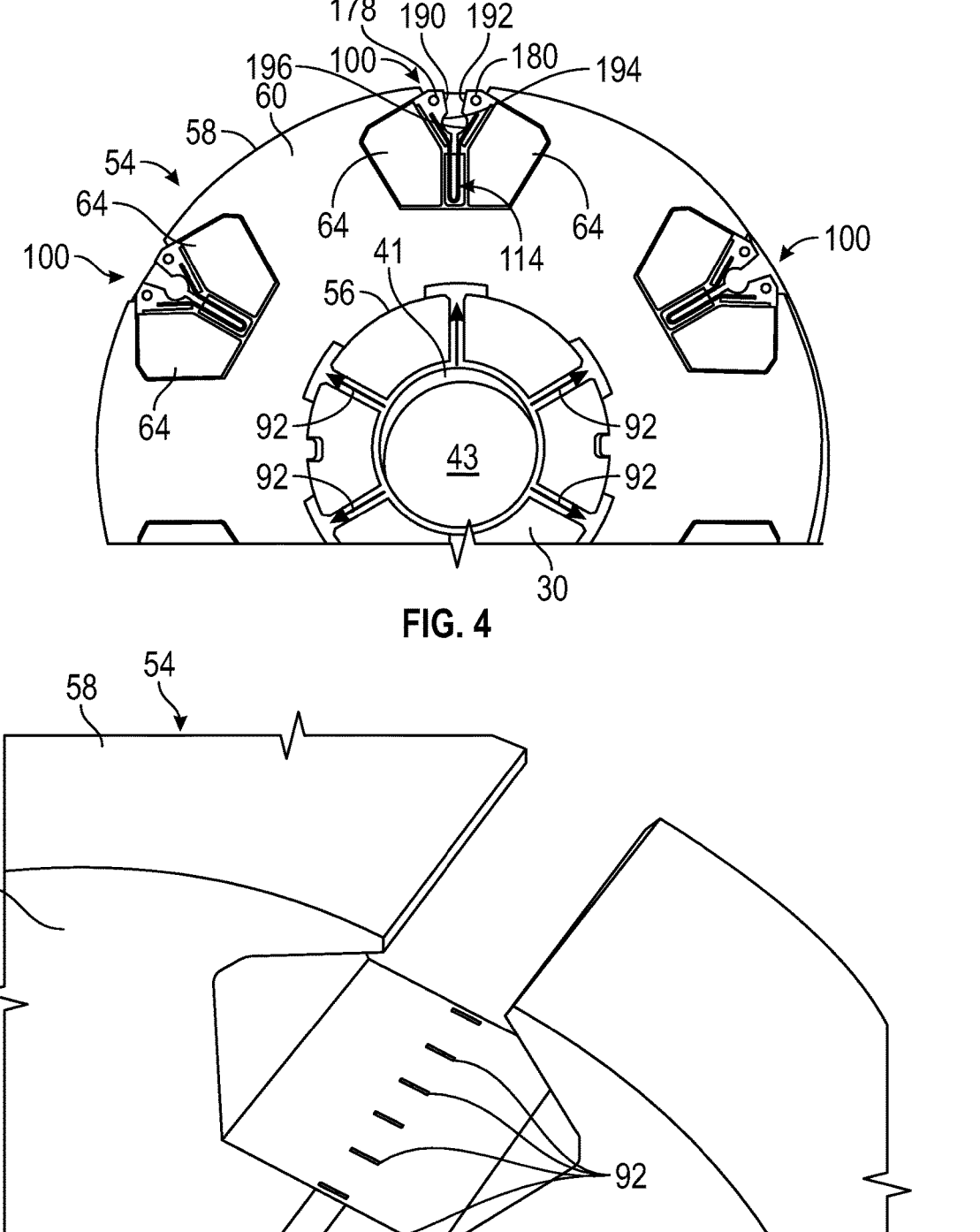
FIG. 4 is an axial end view of the rotor of FIG. 2, in accordance with a non-limiting example.
FIG. 5 is a perspective view of a portion of rotor laminations of the rotor having a field coil separator provided with an integrated coolant flow path, in accordance with a non-limiting example.

In a non-limiting example illustrated in FIG. 4 and FIG. 5, a plurality of coolant passages 92 pass through the plurality of rotor laminations 54 between adjacent ones of the plurality of rotor teeth 60. The plurality of coolant passages 92 extend axially, along axis "A" between adjacent ones of the plurality of rotor teeth 60. Each of the plurality of coolant passages 92 extends radially from inner surface portion 56 to outer surface portion 58. The plurality of coolant passages 92 deliver coolant from coolant flow path 43 along outer surfaces of each of the plurality of field coils 64.

Figure 6:
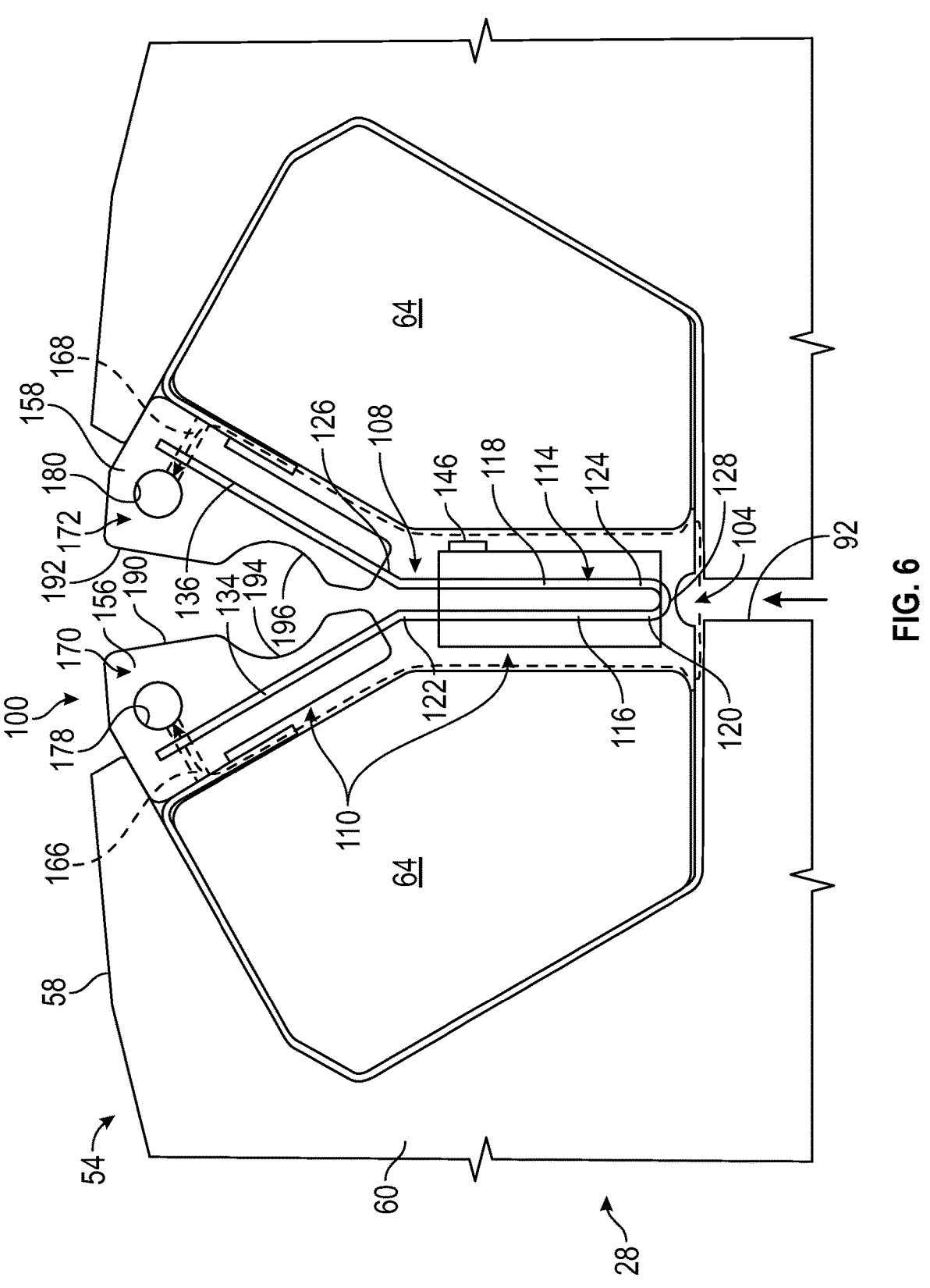
FIG. 6 is a cross sectional view of the rotor taken through the line 6-6 in FIG. 4, in accordance with a non-limiting example.

In a non-limiting example, a plurality of field coil separators, one of which is indicated at 100 are arranged between each of the rotor teeth 60. Field coil separator 100 supports the plurality of field coils 64. As shown in FIG. 6, field coil separator 100 creates a coolant circulation system 104 that guides coolant over exterior surfaces of each of the plurality of field coils 64 and then guides the coolant into each of the first balance ring 80 and the second balance ring 82. In a non-limiting example, field coil separator 100 includes a resilient frame 108 having an outer shell 110.

Figure 7:
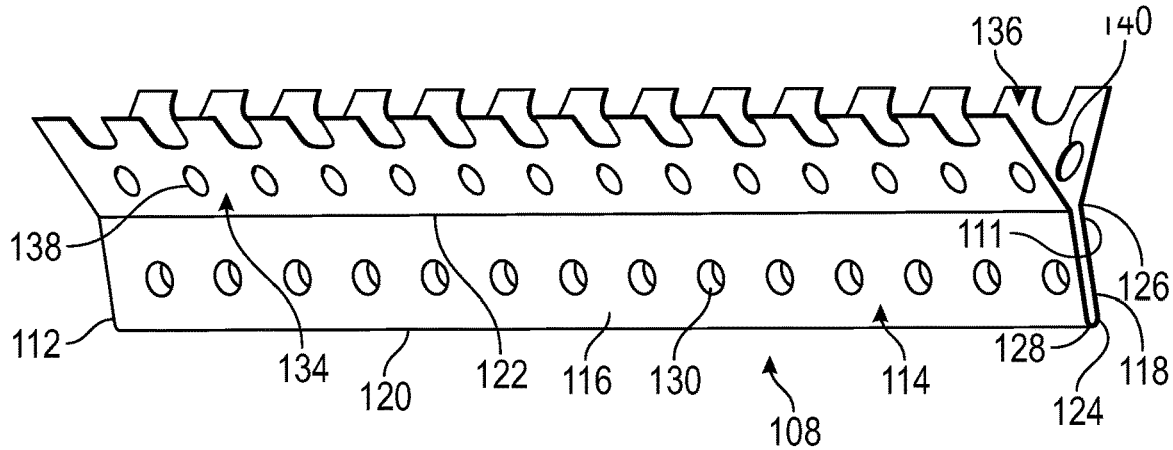
FIG. 7 is a perspective view of a resilient frame of the field coil separator including a base element, a first spring member, and a second spring member, in accordance with a non-limiting example.
Figure 8:
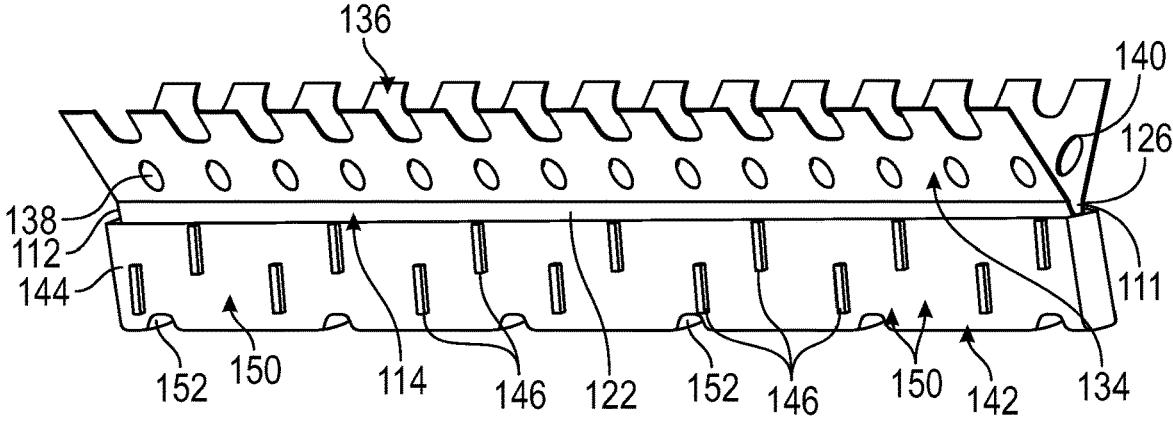
FIG. 8 is a perspective view of the resilient frame of FIG. 8 including a first outer shell member provided on the base element, in accordance with a non-limiting example.

As shown in FIG. 7, resilient frame 108 is formed from a continuous piece of material that is non-magnetic, such as stainless steel. Resilient frame 108 includes a first axial end 111 and a second axial end 112 that is opposite first axial end 112. Resilient frame 108 includes a base element 114, having a first leg 116 and a second leg 118. First leg 116 includes a first end 120 and a second end 122. Second leg 118 includes a first end portion 124 and a second end portion 126. First end 120 and first end portion 124 are joined by a bend portion 128. In a non-limiting example, first leg 116 and second leg 118 may include a plurality of openings 130. Plurality of openings 130 may serve to reduce an overall weight of resilient frame 108. Of course, it should be understood that resilient frame 108 may be formed from other materials including plastics and plastic composites that are resiliently pliable.

In a non-limiting example, a first spring member 134 extends from second end 122 of first leg 116 at a first angle and a second spring member 136 extends from second end portion 126 of second leg 118 at a second angle. As will be detailed more fully herein, first spring member 134 and second spring member 136 facilitate installation and retention of field coil separator 100 between adjacent ones of the plurality of field coils 64. In a manner similar to that discussed in connection with base element 114, first spring member 134 and second spring member 136 are formed with openings 138 that may serve to reduce an overall weight of resilient frame 108.

In a non-limiting example, outer shell 110 includes a first outer shell member 142 that defines a first outer surface 144. First outer surface 144 that extends along first leg 116 and second leg 118 and includes a plurality of coolant guide elements 146 that create a plurality of external coolant flow paths 150 that direct coolant from the plurality of coolant passages 92 radially outward. Plurality of coolant guide elements 146 are shown as extending in a radial direction. It should however be understood that plurality of guide elements 146 may be arranged at various angles depending upon coolant flow characteristics desired. That is, plurality of coolant guild elements 146 may extend radially as shown, parallel to a rotational axis of rotor 54, or along other angles Coolant guide elements 146 may engage and support adjacent ones of the plurality of field coils 64 while the rotor is spinning. First outer shell member 142 also includes a plurality of notches 152 at bend portion 128. The plurality of notches 152 facilitate a coolant transitioning from the plurality of coolant passages 92 to the plurality of external coolant flow paths 150 on first outer surface 144.

In a non-limiting example, outer shell 110 also includes a second outer shell member 156 on first spring member 134 and a third outer shell member 158 on second spring member 136. Second outer shell member 156 defines a second outer surface 160 and third outer shell member 158 defines a third outer surface 162. Second outer shell member 156 includes a first plurality of passages 164 and third outer shell member 158 includes a second plurality of passages 166 (FIG. 6). First plurality of passages 164 are fluidically connected with a first internal coolant return passage 170 formed in second outer shell member 156. Second plurality of passages 166 are fluidically connected with a second internal coolant return passage 172 formed in third outer shell member 158.

Figure 9:
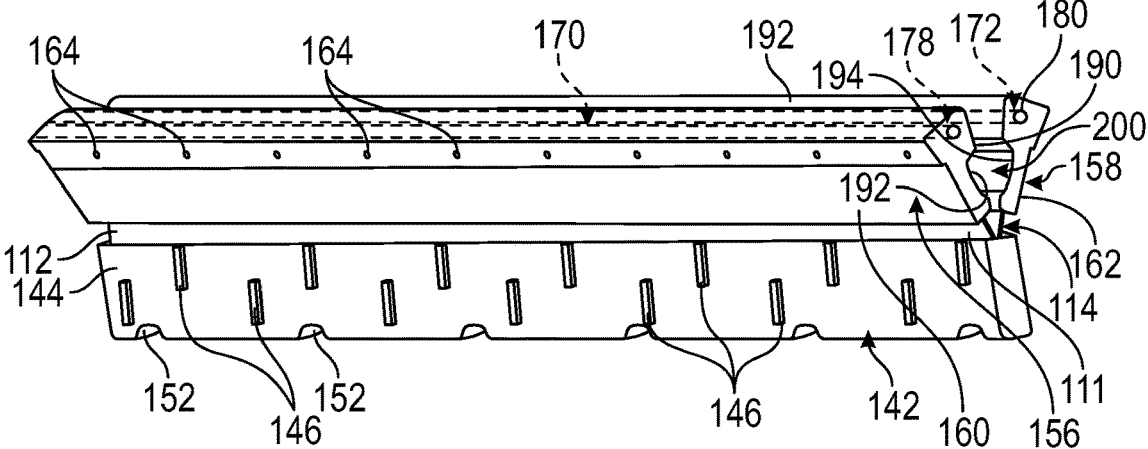
FIG. 9 is a perspective view of the resilient frame of FIG. 9 including a second outer shell member provided on the first spring member and a third outer shell member provided on the second spring member, in accordance with a non-limiting example.

As shown in FIG. 9, first internal coolant return passage 170 defines a first coolant return conduit 178 and second internal coolant return passage 172 defines a second coolant return conduit 180. First coolant return conduit 178 and second coolant return conduit 180 extend substantially parallel to axis "A" and guide coolant flowing over the plurality of field coils 64 axially outwardly into first balance ring 80 and second balance ring 82. As noted herein, the coolant passes from the first plurality of openings 86 and is sprayed onto first end turn 24 and from the second plurality of openings 88 and is sprayed onto second end turn 26 to promote cooling of stator 20.

In a non-limiting example second outer shell 156 and third outer shell 158 do not include the cooling circuit return passages 172 and 178 and do not include the first plurality of passages 164. The coolant flows from the notches 152, meanders through coolant guide elements 146 as the coolant flows radially outward and axially toward first axial end 68 and second axial end 70. In this non-limiting example, the plurality of notches 152 may include only one or two notches located near axial middle (not separately labeled) of first outer shell member 142.

In a non-limiting example, secondary coolant guide elements (not shown), similar to coolant guide elements 146, may be located on second outer shell 156 and third outer shell 158. These secondary coolant guide elements engage adjacent ones of the plurality of field coils 64. Similarly, coolant guide elements 146 may also engage adjacent ones of the plurality of field coils 64.

In a non-limiting example, the of field coils 64, create external coolant flow paths 150 which exist between the first outer surface 144 of the first outer shell member 142, the second outer surface 160 of the second outer shell member 156 and/or the third outer surface 162 of the third outer shell member 158 and the plurality of field coils 64.

In a non-limiting example, second outer shell member 156 includes a first inner surface section 190 and third outer shell member 158 includes a second inner surface section 192. First inner surface section 190 includes a first semi-circular recess 194 that extends between first axial end 111 and second axial end 112 of resilient frame 108. Similarly, second inner surface section 192 includes a second semi-circular recess 196 that extends between first axial end 111 and second axial end 112 of resilient frame 108. First semi-circular recess 192 and second semi-circular recess 194 form a generally cylindrical passage 200 that passes through field coil separator 100 in a direction that is substantially parallel to the axis of rotation "A" of wound field rotor 28.

Figure 12:
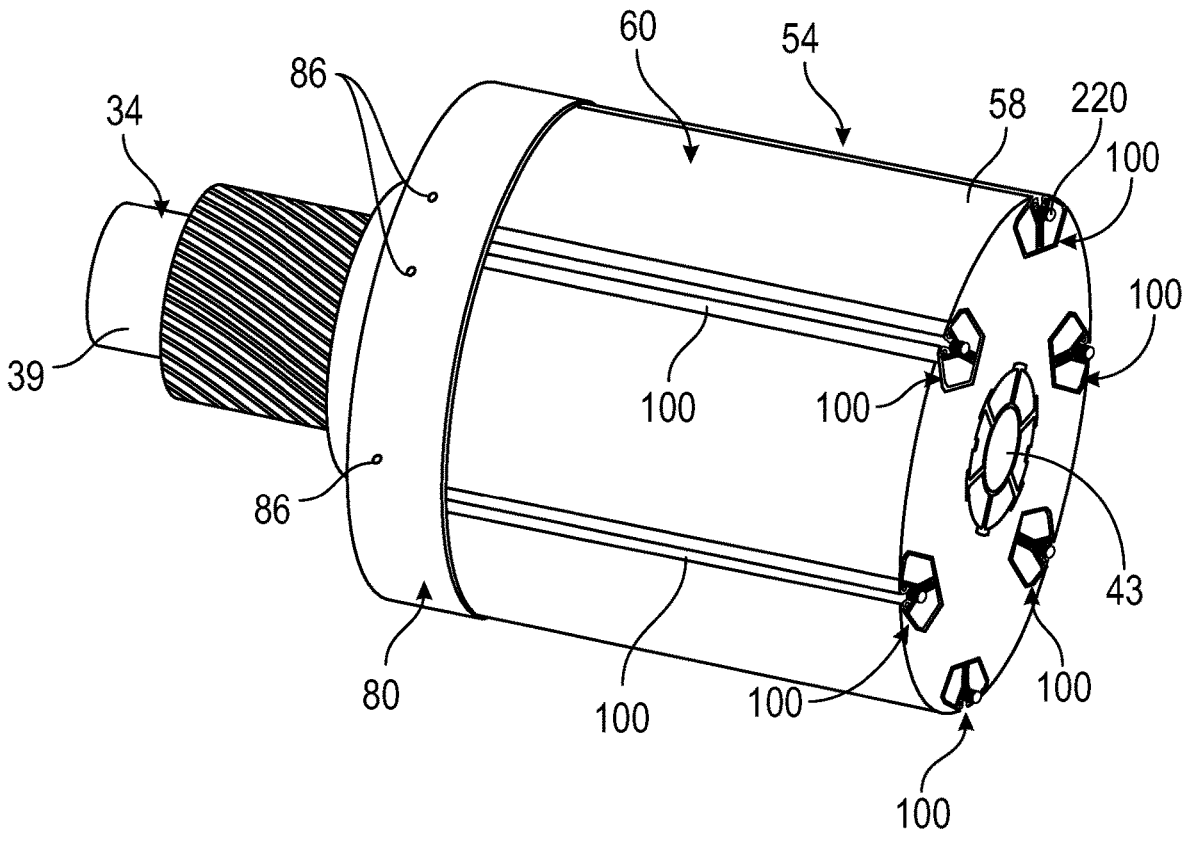
FIG. 12 is a partially disassembled perspective view of the wound coil rotor of FIG. 3 showing mechanical fasteners passing through each field coil separator, in accordance with a non-limiting example.

In a non-limiting example, generally cylindrical passage 200 receives a mechanical fastener 220 used to secure first balance ring 80 and second balance ring 82 to wound field rotor 28 as shown in FIG. 12. Additional fasteners, such as shown at 228 in FIG. 2, are connected to each mechanical fastener 220. In addition to securing first balance ring 80 and second balance ring 82 to wound field rotor 28, mechanical fastener 200 supports first spring member 134 and second spring member 136. That is, when installed, fastener 200 prevents first spring member 134 and second spring member 136 from deflecting inwardly and releasing field coil separator 100 from wound field rotor 28.

Figure 10:
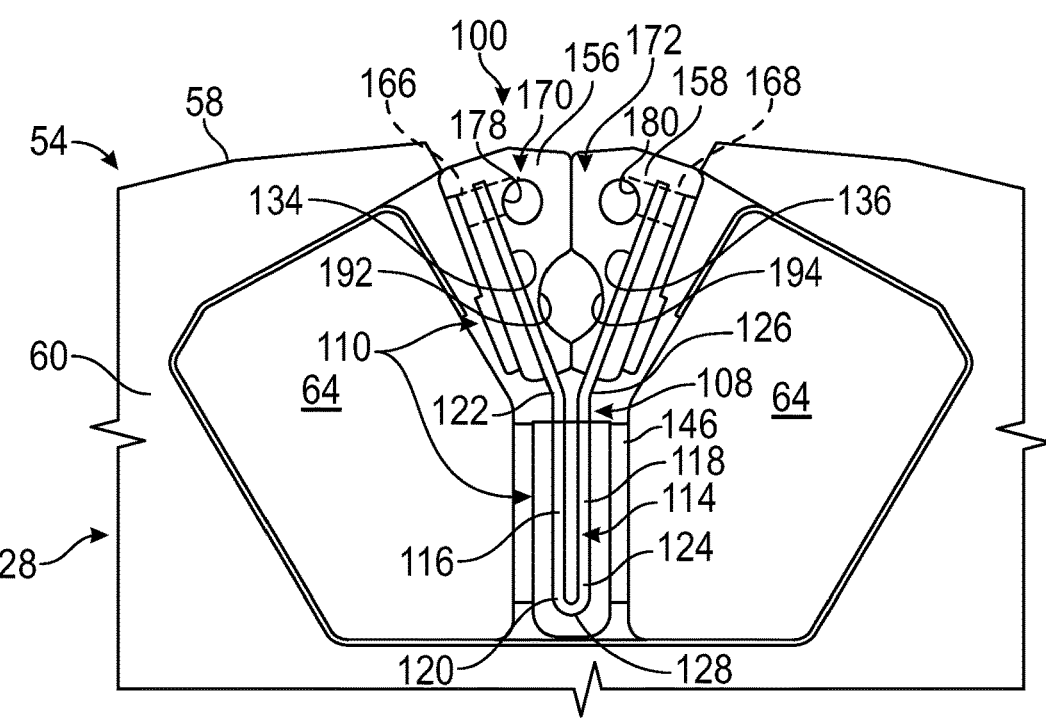
FIG. 10 is an axial end view of the field coil separator with the first spring member and the second spring member being compressed during installation between adjacent field coils of the rotor, in accordance with a non-limiting example.
Figure 11:
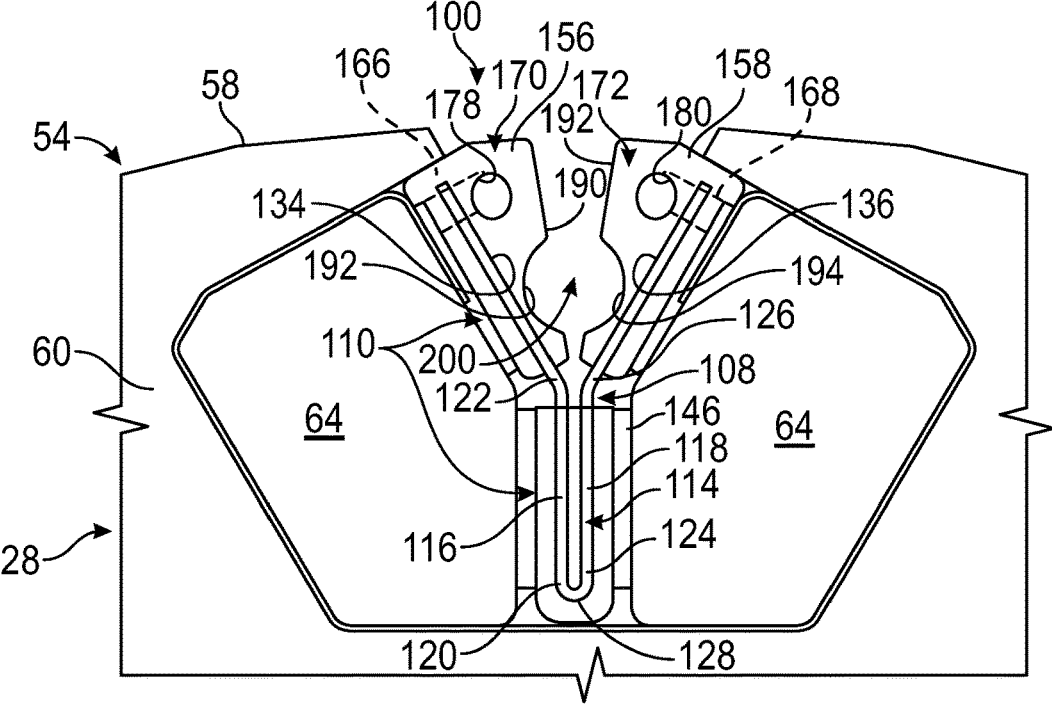
FIG. 11 is an axial end view of the field coil separator of FIG. 10 after the first spring member and the second spring member are released, in accordance with a non-limiting example.

In a non-limiting example, field coil separators 100 are easily installed into wound field rotor 28 prior to connecting first balance ring 80 and second balance ring 82. As shown in FIG. 10, first spring member 134 and second spring member 136 are compressed and field coil separator 100 is installed between adjacent ones of the plurality of field coils 64. Once in place, first spring member 135 and second spring member 136 are released. First spring member 134 and second spring member 136 engage the adjacent ones of the plurality of field coils 64 and are held in place between rotor teeth 60. Once installed, first balance ring 80 and second balance ring 82 may be connected with mechanical fasteners 220 passing through each generally cylindrical passage 220 effectively locking each field coil separator to wound field coil rotor 28. With this arrangement, field coil separators 100 direct coolant flowing through rotor laminations 54 along surfaces of adjacent ones of the plurality of field coils 64, into the balance rings 80 and 82, out the outlet openings 88 and 86, and then axially to be sprayed onto first end turn 24 and second end turn 26 of the stator 20.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A rotor for an electric machine, the rotor comprising:
a shaft including an outer surface section, an inner surface section defining a flow path, and an opening defining a passage extending from the flow path through the outer surface section, the shaft defining an axis of rotation of the rotor;

a plurality of rotor laminations mounted to the outer surface section, the plurality of rotor laminations including an inner surface portion disposed on the shaft, an outer surface portion, and a plurality of rotor teeth, the plurality of rotor laminations include a plurality of coolant passages extending between the inner surface portion and the outer surface portion;

a plurality of field coils disposed about corresponding ones of the plurality of rotor teeth, the plurality of coolant passages extending axially along the plurality of rotor laminations between adjacent ones of the plurality of field coils; and a plurality of field coil separators extending axially along the rotor between adjacent ones of the plurality of field coils, each of the plurality of field coil separators including a coolant circulation system, the coolant circulation system including a plurality of external coolant flow paths, wherein each of the plurality of field coil separators includes a resilient frame and an outer shell over molded onto the resilient frame, the outer shell including an outer surface.

2. The rotor according to claim 1, the resilient frame includes a base element and a first spring member and the plurality of field coil separators are configured to be loaded into the plurality of coolant passages between adjacent ones of the plurality of field coils by first compressing the first spring member and then releasing the first spring member.

3. The rotor according to claim 2, wherein each of the plurality of field coil separators includes a second spring member.

4. The rotor according to claim 3, the first spring member is configured to engage one of the plurality of field coils and the second spring member configured to engage an adjacent one of the plurality of field coils.

5. The rotor according to claim 4, wherein the base element extends substantially along a radius of the rotor, the first spring member extends from the base element at a first angle and the second spring member extends from the base element at a second angle.

6. The rotor according to claim 5, wherein the base element includes a first outer shell member having a first outer surface, the first spring member includes a second outer shell member having a second outer surface, and the second spring member includes a third outer shell member having a third outer surface.

7. The rotor according to claim 6, wherein the second outer shell member includes a first inner surface section and the third outer shell member includes a second inner surface section, the first inner surface section including a first semi-circular recess and the second inner surface section including a second semi-circular recess, the first semi-circular recess and the second semi-circular recess forming a generally cylindrical passage.

8. The rotor according to claim 7, further comprising: a mechanical fastener extending through the generally cylindrical passage substantially parallel to an axis of rotation of the rotor, the mechanical fastener preventing inward deflection of the first spring member and the second spring member.

9. The rotor according to claim 6, wherein each of the first outer surface includes a plurality of coolant guide elements that define the plurality of external coolant flow paths that direct coolant from the base element, the first spring member, and the second spring member.

10. The rotor according to claim 9, wherein at least one internal coolant return passage includes a first coolant return conduit arranged in the second outer shell member and a second coolant return conduit arranged in the third outer shell member, the first coolant return conduit and the second coolant return conduit extending substantially parallel to the axis of rotation of the rotor.

11. The rotor according to claim 10, wherein the second outer shell member includes a first plurality of passages extending between the second outer surface and the first coolant return conduit and the third outer shell member includes a second plurality of passages extending between the third outer surface and the second coolant return conduit.

12. The rotor according to claim 7, wherein a plurality of cooling guide elements engage adjacent ones of the plurality of field coils.

13. An electric machine comprising:

a housing including an interior;

a stator arranged in the interior and fixedly connected to the housing, the stator including a stator core, and a plurality of stator windings supported by the stator core, the plurality of stator windings having a first end turn and a second end turn, the first end turn being axially spaced from the second end turn by the stator core;

a rotor arranged in the interior and rotatably supported within the stator, the rotor comprising:

a shaft including an outer surface section, an inner surface section defining a flow path, and an opening defining a passage extending from the flow path through the outer surface section, the shaft defining an axis of rotation of the rotor;

a plurality of rotor laminations mounted to the outer surface section, the plurality of rotor laminations including an inner surface portion disposed on the shaft, an outer surface portion, and a plurality of rotor teeth, the plurality of rotor laminations include a plurality of coolant passages extending between the inner surface portion and the outer surface portion;

a plurality of field coils disposed about corresponding ones of the plurality of rotor teeth, the plurality of coolant passages extending axially along the plurality of rotor laminations between adjacent ones of the plurality of field coils; and a plurality of field coil separators extending axially along the rotor between adjacent ones of the plurality of field coils, wherein each of the plurality of field coil separators includes a resilient frame and an outer shell over molded onto the resilient frame, the outer shell including an outer surface, wherein the resilient frame includes a base element, a first spring member configured to engage one of the plurality of field coils and a second spring member configured to engage an adjacent one of the plurality of field coils.

14. An electric machine according to claim 13, wherein the plurality of rotor laminations include a first axial end and a second axial end, the first axial end being spaced from the second axial end along the axis of rotation, the first axial end supporting a first balance ring including a first plurality of outlet openings that direct coolant passing from select ones of the plurality of field coil separators onto the first end turn and the second axial end supporting a second balance ring including a second plurality of outlet openings that direct coolant passing from the select ones of the plurality of field coil separators onto the second end turn.

15. The electric machine according to claim 14, each of the plurality of field coil separators including a coolant circulation system, the coolant circulation system including a plurality of external coolant flow paths and at least one internal coolant return passage.

16. The electric machine according to claim 15, wherein the base element extends substantially along a radius of the rotor, the first spring member extends from the base element at a first angle and the second spring member extends from the base element at a second angle.

17. The electric machine according to claim 16, wherein the base element includes a first outer shell member having a first outer surface, the first spring member includes a second outer shell member having a second outer surface, and the second spring member includes a third outer shell member having a third outer surface.

18. The electric machine according to claim 17, wherein the second outer shell member includes a first inner surface section and the third outer shell member includes a second inner surface section, the first inner surface section including a first semi-circular recess and the second inner surface section including a second semi-circular recess, the first semi-circular recess and the second semi-circular recess forming a generally cylindrical passage.

19. The electric machine according to claim 18, further comprising: a mechanical fastener extending through the generally cylindrical passage substantially parallel to an axis of rotation of the rotor, the mechanical fastener preventing inward deflection of the first spring member and the second spring member.

20. The electric machine according to claim 17, wherein each of the first outer surface includes a plurality of coolant guide elements that define the plurality of external coolant flow paths that direct coolant from the base element, the first spring member, and the second spring member.

21. The electric machine according to claim 20, wherein the at least one internal coolant return passage includes a first coolant return conduit arranged in the second outer shell member and a second coolant return conduit arranged in the third outer shell member, the first coolant return conduit and the second coolant return conduit extending substantially parallel to the axis of rotation of the rotor.

22. The electric machine according to claim 21, wherein the second outer shell member includes a first plurality of passages extending between the second outer surface and the first coolant return conduit and the third outer shell member includes a second plurality of passages extending between the third outer surface and the second coolant return conduit.

* * * * *